No. 678,535. Patented July 16, 1901.
A. BIGG.
HOE.
(Application filed Feb. 2, 1901.)
(No Model.)
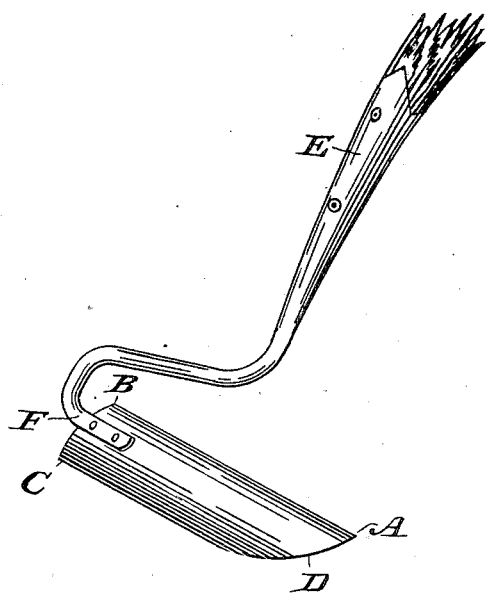
Witnesses.
E. B. Bolton
Inventor:
Austen Bigg
By Richard G.
his Attorneys.

UNITED STATES PATENT OFFICE.

AUSTEN BIGG, OF TOOWOOMBA, QUEENSLAND.

HOE.

SPECIFICATION forming part of Letters Patent No. 678,535, dated July 16, 1901.

Application filed February 2, 1901. Serial No. 45,742. (No model.)

*To all whom it may concern:*

Be it known that I, AUSTEN BIGG, vigneron and orchardist, residing at Merryfields, Toowoomba, in the Colony of Queensland, have invented a certain new and useful Improved Hoe; and I do hereby declare the following to be a full, clear, and exact description of the invention, such as will enable others skilled in the art to which it appertains to make and use the same.

My invention relates to hoes for use in gardens or orchards or general agricultural purposes; and it consists of a specially-devised blade attached to a long handle in a special way, the object being the production of a cheap implement that can be worked both ways—that is to say, when pushed from the operator or pulled to him.

My invention consists of a thin sheet of steel having a length about two and a half times its width. This is dished or curved in the direction of its length. At one end in the center is riveted or may be otherwise fastened a bent handle-socket, and at the other end the corner farthest from the handle is rounded off, so as to form a point on the corresponding side.

In order to make my invention quite clear, I will now describe it with reference to the accompanying drawing, in which the figure represents a perspective view of the hoe.

The edges A B, A D, D C are ground sharp.

The socket E may be riveted, as at F, or may be in one piece with the blade.

I attach, preferably, a long wooden handle, so that weeds under young trees or bushes can be easily reached.

The operation of the hoe is as follows: The operator when hoeing first raises the handle and pushes the hoe from him, thus bringing the front cutting edge A D and D C into play. When the limit of his stretch is reached, he depresses the handle, moves the hoe slightly to the left, and draws it toward him, bringing cutting edge A B into play, and so does work on both strokes.

With all hoes two strokes are made by the operator, and a portion of the energy expended in such is wasted, whereas with my hoe all the energy transmitted to the handle is utilized, and as the hoe cuts the same width with both the forward and back stroke double the area of ground is worked within the same time and with the expenditure of the same power as is required by an ordinary hoe.

The dishing or concavity allows the hoe to enter the ground freely, and with an entire absence of choking the weeds and soil falling freely from the hoe whichever way it is used.

The hoe is pointed at one end for the purpose of digging out weed roots.

The size of the hoe may be varied according to the ground it is required to be worked on, and to meet this condition it would be made in two or more sizes.

Having thus described my invention, what I claim as new, and desire to secure by Letters Patent, is—

An improved hoe consisting of a concave steel plate having a straight cutting edge on one side and a partly-straight and partly-curved cutting edge on the opposite side, a bent handle-socket secured to the plate at one end and so bent that the handle attached thereto is at right angles to the cutting edges of the hoe.

In testimony that I claim the foregoing as my invention I have signed my name in presence of two subscribing witnesses.

AUSTEN BIGG.

Witnesses:
E. E. QUINLAN,
D. KIRBY.